United States Patent [19]

Kalz et al.

[11] Patent Number: 4,724,098

[45] Date of Patent: Feb. 9, 1988

[54] GEL-FORMING ORGANOPHILIC LAYER SILICATE, PROCESS FOR ITS PREPARATION AND USE

[75] Inventors: Hans-Jürgen Kalz, Liederbach; Thomas Blumenthal, Frankfurt am Main; Hans-Walter Bücking, Kelkheim; Manfred Hofinger, Burgkirchen, all of Fed. Rep. of Germany

[73] Assignee: Hoechst Aktiengesellschaft, Frankfurt am Main, Fed. Rep. of Germany

[21] Appl. No.: 871,073

[22] Filed: Jun. 5, 1986

[30] Foreign Application Priority Data

Jun. 7, 1985 [DE] Fed. Rep. of Germany ....... 3520314

[51] Int. Cl.[4] .......................... B01J 13/00; C07F 5/06; C23F 11/00
[52] U.S. Cl. ........................... 252/315.2; 106/287.17; 556/173
[58] Field of Search ................. 252/315.2; 106/287.17; 556/173

[56] References Cited

U.S. PATENT DOCUMENTS

| | | | |
|---|---|---|---|
| 4,410,364 | 10/1983 | Finlayson et al. | 252/315.2 X |
| 4,434,075 | 2/1984 | Mardis et al. | 252/315.2 |
| 4,434,076 | 2/1984 | Mardis et al. | 252/315.2 |

FOREIGN PATENT DOCUMENTS 3145457 9/1982 Fed. Rep. of Germany .
3149131 6/1983 Fed. Rep. of Germany .

Primary Examiner—Richard D. Lovering

[57] ABSTRACT

Gel-forming organophilic layer silicate whose exchangeable cations have been wholly or partly replaced by a quaternary ammonium compound of the formula

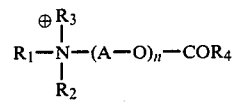

where $R_1$ and $R_2$ can be identical or different and denote $C_6$–$C_{30}$-alkyl or $C_6$–$C_{30}$-alkenyl, $R_3$ denotes $C_1$–$C_6$-alkyl, $R_4$ denotes $C_1$–$C_6$-alkyl, A denotes the group —$C_2H_4$— or —$C_3H_6$— and n denotes 1 or 2. These organically modified layer silicates are used as thixotroping agents, for example for surface coatings and antirust primers.

15 Claims, No Drawings

GEL-FORMING ORGANOPHILIC LAYER SILICATE, PROCESS FOR ITS PREPARATION AND USE

The invention relates to organophilic layer silicates which are dispersible in organic solvents to form a gel.

Organosmectites or organophilic layer silicates, which are clay minerals coated with organic cations, are good thixotroping agents for organic systems of various polarities. The clay minerals which can be used belong to the group of 2:1 layer silicates, the layers of which carry a negative charge which is neutralized by inter-layer cations. In terms of crystal structure, a distinction is made between dioctahedric and trioctahedric types. The dioctahedric types include montmorillonite with the special case of bentonite, beidellite and nontronite. The trioctahedric group includes saponite and hectorite. The most important types for use as thixotroping agents are hectorites and bentonites.

It is known, for example from German Offenlegungsschrift No. 3,149,131, that a layer silicate with exchangeable cations and aqueous solutions of an organic tetraalkylammonium salt (for example dimethyldistearylammonium chloride or dimethylbenzylstearylammoniun chloride) can be used to prepare organophilic layer silicates (organosmectites) which are suitable for producing gels in organic solvents. The organophilic layer silicates are generally preswelled in an organic solvent before use. It is customary to prepare pastes with about 10% by weight, so-called stock pastes, which are stored for at least 24 hours before use, so that the silicates can develop their full activity. Organic solvents used for this purpose are hydrocarbons, such as toluene, xylene and benzine, but also more polar solvents such as alcohols and ketones. Hydrocarbons of a higher molecular weight can be used to obtain firmer stock pastes.

If apolar solvents are used for preparing the stock paste, it is frequently necessary to add small amounts (for example up to 40% by weight based on the silicate used) of a polar solvent, such as methanol.

Instead of the polar solvent it is also possible to add, for the gelling of organically pretreated layer silicates, ionic or nonionic wetting agents, which are indeed commercially available for this purpose. These additives are generally added in amounts of 10-60% by weight, based on the organosilicate, to the suspension in an organic solvent. Through this addition the pastes frequently become more fluent and therefore are easier to handle. Also, the time it takes for the gel to form can be shorter.

However, the organophilic layer silicates prepared by the abovementioned process lead to stock pastes which are not stable to storage and, after an extended period, separate off solvent, the remaining part of the pastes becoming harder and higher in solids. The pastes must therefore be stirred up again before use. Furthermore, the initial concentration of the organophilic silicate in the stock paste is limited, since there is otherwise a danger that the paste becomes too firm and can no longer be used. In addition to in the abovementioned German Offenlegungsschrift No. 3,149,131, organophilically modified layer silicates which contain a quaternary ammonium compound of a similar structure are also described in German Offenlegungsschrift No. 3,145,457.

It is therefore the object of the present invention to find new organo layer silicates whose pastes have increased stability to storage and permit a higher initial concentration of organophilic silicate.

It has been found that this object is achieved with a gel-forming organophilic layer silicate whose exchangeable cations are wholly or partly replaced by a quaternary ammonium compound of the formula

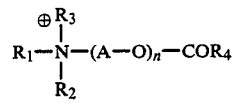

where $R_1$ and $R_2$ can be identical or different and denote $C_6$–$C_{30}$-alkyl, preferably $C_8$–$C_{18}$-alkyl, or $C_6$–$C_{30}$ alkenyl, preferably $C_8$–$C_{18}$-alkenyl, $R_3$ denotes $C_1$–$C_6$-alkyl, preferably $C_1$–$C_4$-alkyl, $R^4$ denotes $C_1$–$C_6$-alkyl, A denotes the group —$C_2H_4$— or —$C_3H_7$— and n denotes 1 or 2.

The organophilic layer silicates according to the invention can be prepared by reacting a layer silicate which has exchangeable cations with a salt which contains as the cation a quaternary ammonium compound of the formula shown above. The reaction is carried out in the presence of a solvent for the quaternary ammonium compound, preferably in water; however, it is also possible to use organic solvents, such as alcohols. The quaternary ammonium compounds contain as anions the anions of organic acids or halide, methosulfate or methophosphate ions. Suitable organic acids are in particular $C_1$–$C_6$-alkanemonocarboxylic acids, $C_1$–$C_6$-hydroxymonoalkanecarboxylic acids, $C_2$–$C_6$-alkanedicarboxylic acids, mono- or di-hydroxy-C2-C6-alkanedicarboxylic acids, fumaric acid, maleic acid, citric acid or benzoic acid. Preferred acids are acetic acid, propionic acid and lactic acid.

The layer silicates used are known natural or synthetic layer silicates, in particular 2:1 layer silicates, preferably hectorite, bentonite, montmorillonite, beidellite, saponite and sterensite. When natural clay minerals are used, it is necessary to purify the raw material beforehand by separating off nonswellable material. The layer silicate should preferably be present in a highly swellable form, for example the sodium form. This form is readily prepared by means of a preceding ion exchange reaction. It is particularly advantageous for the layer silicates used to be as finely divided as possible. The crystal size can be measured via the half-value width of X-ray diffraction reflections (H. Krischner, Einführung in die Röntgenfeinstrukturanalyse [Introduction to X-ray fine structure analysis], Braunschweig, 1980). The crystal size of layer silicates can be determined especially by the half-width value of the reflection which belongs to the 060 plane (British Pat. No. 1,376,379, page 3).

The most suitable layer silicates have 060 half-value widths between 0.8 and 1.2° (2 $\theta$), preferably between 0.8 and 1.0° (2 $\theta$). Layer silicates having the indicated half-value width can be easily prepared synthetically. It has been found to be particularly suitable to use hectorites which have been synthesized under hydro-thermal conditions. The highly swellable layer silicates thus obtained are particularly suitable for preparing the organophilic layer silicates according to the invention.

For gel formation it is desirable for the layer silicate used to have an ion exchange capacity of 50-120 meq/100 g, in particular 80-100 meq/100 g of silicate.

The preparation of a synthetic hectorite from an aqueous solution or suspension containing magnesium ions, an Na2O source and an SiO2 source is described in German Offenlegungsschrift No. 3,207,886. Lithium and/or fluoride ions can also be present. If the SiO2 source (usually sodium silicate) only contains very small amounts of dissolved aluminum, it is further possible to add small amounts of aluminum ions to the starting reaction mixture, insofar as there is a wish for a somewhat higher ion exchange capacity of the resulting hectorite.

To prepare the organophilic layer silicate it is desirable to add per 100 g of layer silicate at least 80 meq of quaternary ammonium compound, preferably 100 to 150 meq. Frequently the quaternary ammonium compounds are supplied not in the form of a pure substance but as still containing organic solvents, such as, for example, isopropanol. However, these solvents do not impair the qualitative constitution of the organophilic layer silicate prepared according to the invention. If the organophilic layer silicates according to the invention are prepared starting from synthetic substrates, it is not necessary to separate these silicates after the synthesis from the alkaline mother liquor which can still contain considerable amounts of foreign salts. The silicate suspension used may on the contrary, depending on the layer silicate content, be diluted with water and, after buffering to pH 8-9.5 with inorganic acids, such as sulfuric acid, or organic acids, have the quaternary ammonium compound added to it. It has been found suitable in this context to cover the layer silicate with the organic cation in two steps, in which the larger proportion of quaternary ammonium salt is to be used in the first step. After the first step the solids can easily be separated from the aqueous phase which contains the foreign ions). The covering with quaternary ammonium salt in the second step does not require any special measures and can be carried out like that in the first step.

To carry out a reaction with the quaternary ammonium compounds in an aqueous phase, a clay suspension is prepared with a layer silicate content of 1-10% by weight, preferably 3-5% by weight. This suspension is heated to 50°-100° C., preferably 70°-80° C. The exchange is also possible at room temperature, but then it takes longer. When activated silicates are used, i.e. silicates in the Na form, a dwell time of 15-60 min, in particular 20-30 min, is totally adequate.

After the reaction has taken place, the organosilicate is filtered off with suction, washed until salt-free, dried and, in individual cases, ground. The organophilic layer silicate thus prepared produces on dispersion in organic solvents (toluene, chlorobenzene, xylene, benzine, alcohols and ketones) pastes having good stability to storage. Hydrocarbons having a higher molecular weight lead to firmer stock pastes. The organophilic layer silicate solids content is 5 to 60% by weight, preferably 15 to 40% by weight. These pastes are comparable in rheological properties to prior art products. However, they have improved stability to storage. If, however, the synthetic layer silicates with the specified half-value widths of 0.8°-1.0° (2 θ) are used, it is possible to obtain even more concentrated pastes having good rheological values and increased stability to storage.

The organophilic layer silicates prepared according to the invention are suitable in particular for use as additives having improved thixotropic properties and for reducing the sedimentation tendency in systems which are based on organic solvents for example for surface coatings and antirust primers. The invention is illustrated in more detail by the following examples.

Example 1

A synthetic hectorite having an ion exchange capacity of 90 meq/100 g is reacted with a quaternary ammonium compound of the formula II in a ratio of 120 meq of ammonium compound per 100 g of silicate.

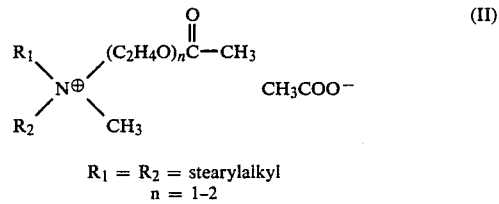

$R_1 = R_2 = $ stearylalkyl
$n = 1-2$

The exchange is carried out at a temperature of 60° C. in the course of 30 min in the aqueous phase with a hectorite concentration of 3% by weight. The organosilicate obtained is filtered off from the aqueous phase, washed and dried at 70° C. to constant weight.

The pulverulent product is used to prepare a stock paste which is composed of 85 g of xylene, 10 g of organosilicate and 5 g of Additol ®XL 270, a wetting and gelling agent.

To test the organosilicate prepared according to the invention, a rust primer is put together according to the following recipe:
6.5 g of phenolic resin (Phenodur ® PR 263, 70% strength in butanol)
12.5 g of pigment mixture*
1 g of carbamic acid ester resin of butylurethane and formaldehyde (Uresin ® B)
1 g of organosilicate paste as described above
57.5 g of solvent mixture**
9.5 g of polyvinyl butyral
2 g of 85% strength phosphoric acid (1:1 in butanol)
*The pigment mixture has the following composition:
32 g of zinc yellow, 20.8 g of zinc tetraoxychromate, 8.8 g of iron oxide pigment, 17.6 g of zinc phosphate.
** The solvent mixture contains 46.7 g of ethanol, 38.5 g of methyl ethyl ketone and 14.8 g of toluene.

The rust primer thus prepared was tested with respect to its viscosities and its separation and sedimentation properties. Furthermore, to carry out a test of its application properties on iron sheets, a coating was applied in a dry film thickness of 35 μm. These sheets were cross-hatched in accordance with DIN 53,151, and after 14 days of storage in water the film was examined for blisters. The primer with the organosilicate prepared according to the invention gave the following data:

| | | |
|---|---|---|
| Viscosity | after preparation | 45" |
| | after 40 days | 58" |
| Sedimentation | after 40 days | 0 |
| | after 6 months | 2 |
| Separation | after 40 days | 0 |
| | after 6 months | 2 |
| Cross-hatch | after 2 days | GT 1 |
| Blistering | after 14 days of storage in water | none |

The viscosity was measured by measuring the efflux time in the Ford cup in accordance with 4-DIN 53,211.

The separation properties were assessed by observing the formation of a pigment-free phase which floats on the primer. The assessment is carried out as a function of the volume:

| no separation | 0 | 25% of the total volume | 3 |
|---|---|---|---|
| slight separation | 1 | 50% of the total volume | 4 |
| 10% of the total volume | 2 | 75% of the total volume | 5 |

The sedimentation properties were assessed on the basis of the amount of sediment formed and its consistency:

| no sediment | 0 | sediment can easily be stirred up | 2 |
|---|---|---|---|
| trace of sediment | 1 | sediment still possible to stir up | 3 |

EXAMPLE 2 (COMPARATIVE EXAMPLE)

A synthetic hectorite having an ion exchange capacity of 90 meq/100 g is reacted with benzyldimethylstearylammonium chloride as described in Example 1. The organohectorite obtained is tested as described in a primer. The following result is obtained:

| Viscosity | after preparation | 39" |
|---|---|---|
| | after 40 days | 45" |
| Sedimentation | after 40 days | 0 |
| | after 6 months | 2 |
| Separation | after 40 days | 3 |
| | after 6 months | 5 |
| Cross-hatch | after 2 days | GT 1 |
| Blistering | after 14 days of storage in water | none |

EXAMPLE 3 (COMPARATIVE EXAMPLE)

As in Examples 1 and 2 an organohectorite is prepared using ethanolmethyldistearylammonium chloride and tested. The rust primer gave the following result:

| Viscosity | after preparation | 50" |
|---|---|---|
| | after 40 days | 60" |
| Sedimentation | after 40 days | 0 |
| | after 6 months | 2 |
| Separation | after 40 days | 2 |
| | after 6 months | 4 |
| Cross-hatch | after 2 days | GT 1 |
| Blistering | after 14 days of storage in water | none |

The examples show that an organohectorite prepared according to the invention significantly improves the sedimentation properties in polar formulations while retaining all the other properties.

EXAMPLE 4 (COMPARATIVE EXAMPLE)

This example shows that the use of the quaternary ammonium compounds described offers advantages even when the starting layer silicates used are natural bentonites having a lower exchange capacity than actually preferred. A natural bentonite having a relatively low exchange capacity AK (Bentonit EPH from Südchemie, Munich, AK=ca. 60 meq/100 g) is reacted with the quaternary compound used in Example 1 in a ratio of 80 meq of ammonium compound per 100 g of bentonite. The testing was again carried out within a rust primer of the specified recipe, and gave the following result:

| Viscosity | after preparation | 42" |
|---|---|---|
| | after 40 days | 56" |
| Sedimentation | after 40 days | 0 |
| | after 6 months | 2 |
| Separation | after 40 days | 1 |
| | after 6 months | 3 |
| Cross-hatch | after 2 days | GT 1 |
| Blistering | after 14 days of storage in water | none |

We claim:

1. A gel-forming organophilic layer silicate whose exchangeable cations are wholly or partly replaced by organic cations, wherein the organic cation is a quaternary ammonium ion of the formula I $$R_1 - \overset{\overset{\oplus}{R_3}}{\underset{R_2}{N}} - (A-O)_n - COR_4 \quad (I)$$

where $R_1$ and $R_2$ can be identical or different and denote $C_6$–$C_{30}$-alkyl or $C_6$–$C_{30}$-alkenyl, $R_3$ denotes $C_1$–$C_6$-alkyl, $R_4$ denotes $C_1$–$C_6$-alkyl, A denotes the group $-C_2H_4-$ or $-C_3H_6-$ and n denotes 1 or 2.

2. The gel-forming organophilic layer silicate as claimed in claim 1, which contains a quaternary ammonium ion of the formula I where $R_1$ and $R_2$ can be identical or different and denote $C_8$–$C_{18}$-alkyl or $C_8$–$C_{18}$-alkenyl, $R_3$ denotes $C_1$–$C_4$-alkyl, $R_4$ denotes $C_1$–$C_6$-alkyl, A denotes the group $-C_2H_4-$ or $-C_3H_6-$ and n denotes 1 or 2.

3. The gel-forming organophilic layer silicate as claimed in claim 1, wherein the layer silicates are hectorites, bentonites and montmorillonites.

4. The gel-forming organophilic layer silicate as claimed in claim 1, wherein the layer silicates have an ion exchange capacity of 50–120 meq/100 g of layer silicate.

5. The gel-forming organophilic layer silicate as claimed in claim 1, wherein the layer silicates have 060 half-value widths of 0.8°–1.2° (2 θ).

6. The gel-forming organophilic layer silicate as claimed in claim 1, wherein at least 80% of all exchangeable cations are replaced by the quaternary ammonium cation.

7. The gel-forming organophilic layer silicate as claimed in claim 1, wherein the layer silicates have an ion exchange capacity of 80–100 meq/100g of silicate.

8. The gel-forming organophilic layer silicate as claimed in claim 1, wherein the layer silicates have 060 half-value widths of 0.8° to 1.0° (2 θ).

9. A process for preparing the gel-forming organophilic layer silicate as claimed in claim 1, which comprises reacting the layer silicate in a solvent with a salt which contains the quaternary ammonium ion of the formula I.

10. The process as claimed in claim 9, wherein said solvent comprises water.

11. The process as claimed in claim 9, wherein said salt is an acetate, propionate or lactate.

12. A dispersion in gel form which contains layer silicates in an organic solvent, wherein the dispersion contains 5 to 60% by weight of the gel-forming organophilic layer silicate as claimed in claim 1.

13. The dispersion as claimed in claim 12, wherein the dispersion contains 15 to 40% by weight of said gel-forming organophilic layer silicate.

14. A gel-forming organophilic layer silicate whose exchangeable cations have been at least partially replaced by cations of a quaternary ammonium salt, the cations of the quaternary ammonium salt containing an esterified hydroxyalkyl radical, said cations having the formula I $$R_1-\overset{\overset{\oplus R_3}{|}}{\underset{\underset{R_2}{|}}{N}}-(A-O)_n-COR_4 \quad (I)$$

where $R_1$ and $R_2$ can be identical or different and denote $C_6$–$C_{30}$-alkyl or $C_6$–$C_{30}$-alkenyl, $R_3$ denotes $C_1$–$C_6$-alkyl, $R_4$ denotes $C_1$–$C_6$ alkyl, A denotes the group —$C_2H_4$— or —$C_3H_6$— and n denotes 1 or 2, the anions of said salt being the anions of an organic acid or halide, methosulfate or methophosphate.

15. The gel-forming organophilic layer silicate as claimed in claim 14, wherein said anion is acetate, propionate or lactate.

* * * * *